FIG. 2 EFFECT OF A SPEARMINT-BASE GUM FORMULATED WITH PYRUVALDEHYDE (DETERMINED BY DIRECT CHEWING) ON GROWTH OF A MIXED POPULATION OF ORAL MICROORGANISMS.

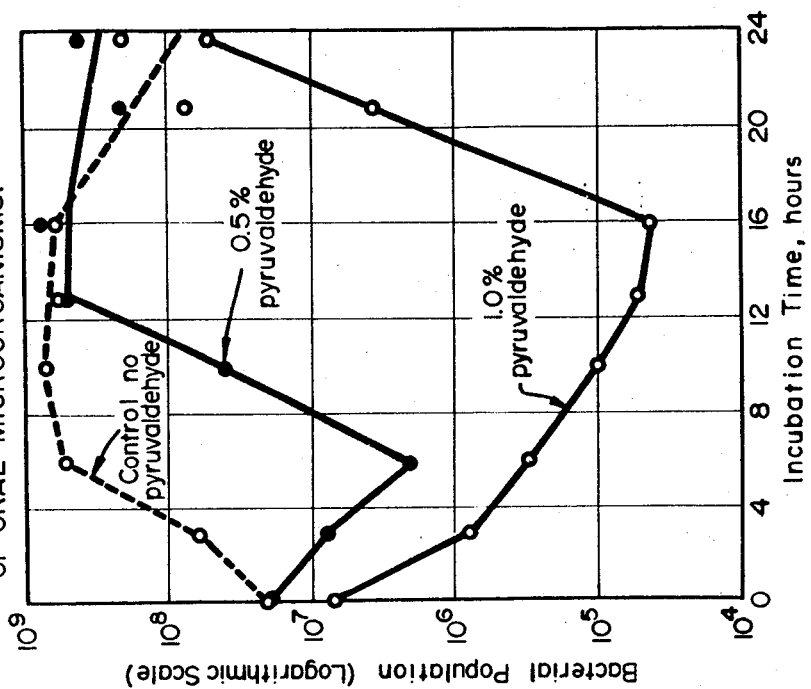

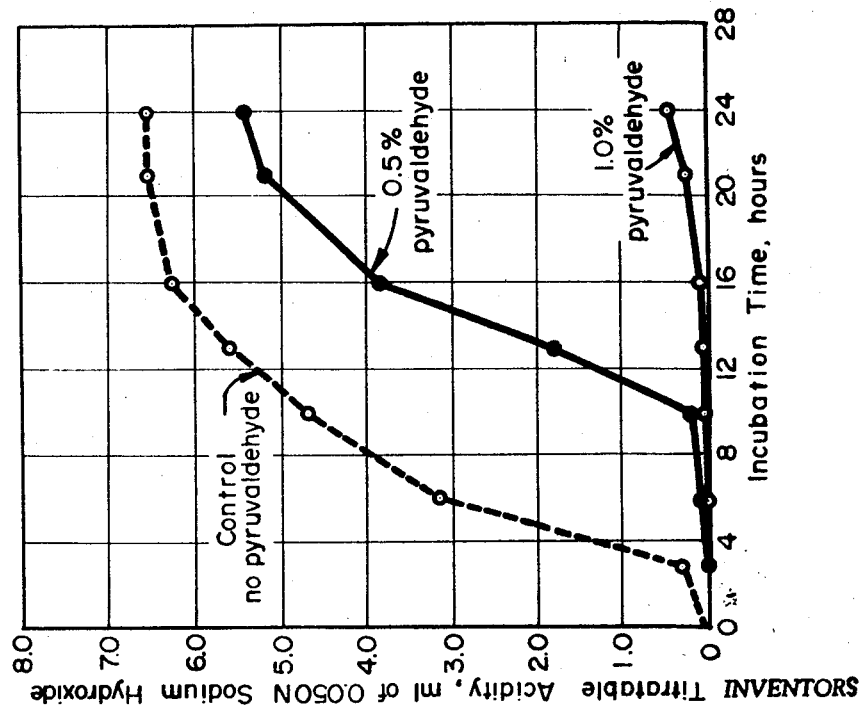

FIG. 1 EFFECT OF A SPEARMINT-BASE GUM FORMULATED WITH PYRUVALDEHYDE (DETERMINED BY DIRECT CHEWING) ON ACID PRODUCTION BY A MIXED POPULATION OF ORAL MICROORGANISMS.

INVENTORS
JOHN H. LITCHFIELD
and VICTOR G. VELY

BY *LeBlanc & Shur*

ATTORNEYS

EFFECT OF A SALIVARY EXTRACT OF A SPEARMINT-BASE GUM FORMULATED WITH 0.5% PYRUVALDEHYDE and 2.0% d,l-GLYCERALDEHYDE ON ACID PRODUCTION By ORAL STREPTOCOCCI.

EFFECT OF A SALIVARY EXTRACT OF A SPEARMINT-BASE GUM FORMULATED WITH 0.5% PYRUVALDEHYDE and 2.0% d,l-GLYCERALDEHYDE on GROWTH of ORAL STREPTOCOCCI.

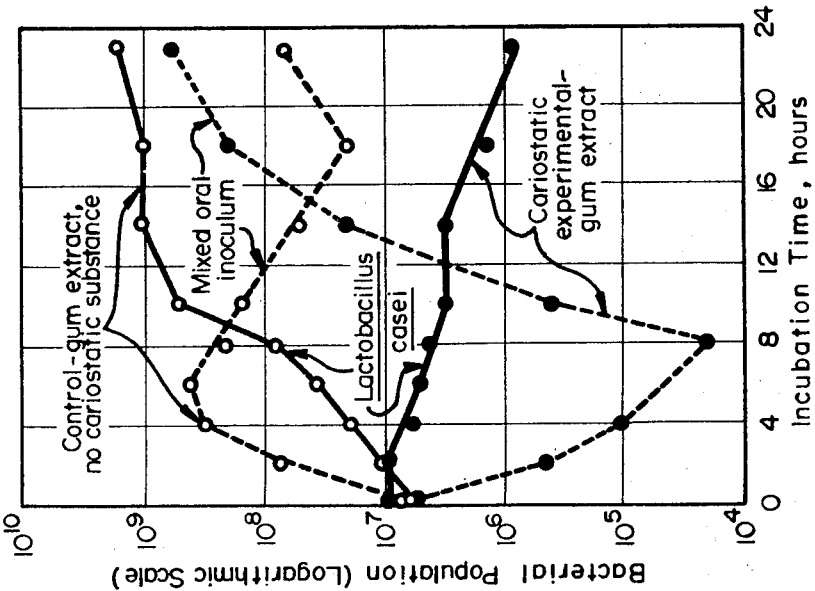

FIG. 6
EFFECT OF A SALIVARY EXTRACT OF A SPEARMINT-BASE GUM FORMULATED WITH 0.5% PYRUVALDEHYDE AND 2.0% d,l-GLYCERALDEHYDE on GROWTH of ORAL MICROORGANISMS.

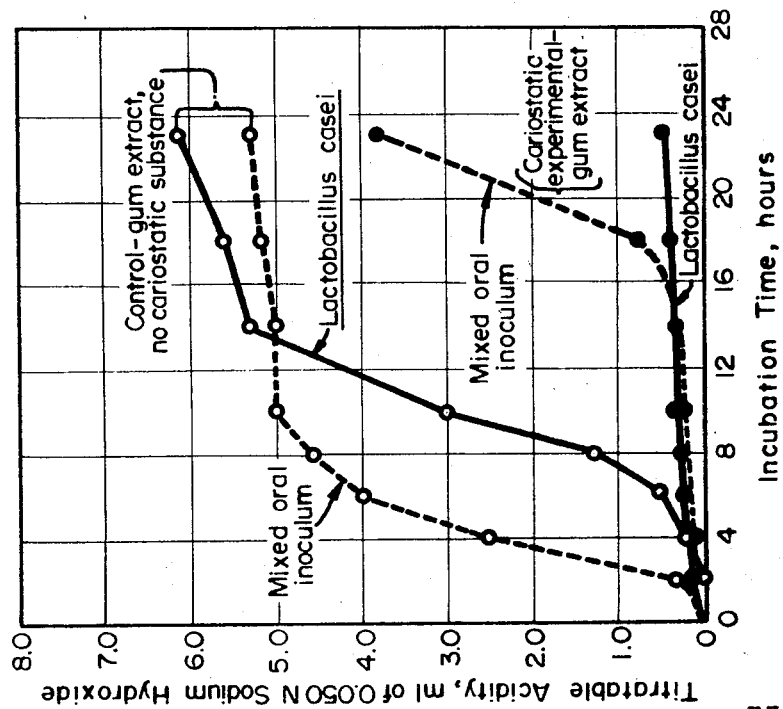

FIG. 5
EFFECT OF A SALIVARY EXTRACT OF A SPEARMINT-BASE GUM FORMULATED WITH 0.5% PYRUVALDEHYDE AND 2.0% d,l-GLYCERALDEHYDE ON ACID PRODUCTION by ORAL MICROORGANISMS.

INVENTORS
JOHN H. LITCHFIELD
and VICTOR G. VELY
BY L. Blane & Shur
ATTORNEYS

United States Patent Office 3,651,206
Patented Mar. 21, 1972

3,651,206
ANTICARIES CHEWING GUM
John H. Litchfield, Worthington, and Victor G. Vely, Columbus, Ohio, assignors to Wm. Wrigley Jr. Company, Chicago, Ill.
Continuation-in-part of application Ser. No. 790,314, Jan. 10, 1969. This application Sept. 18, 1969, Ser. No. 858,996
Int. Cl. A61k 7/16, 9/00
U.S. Cl. 424—48
19 Claims

ABSTRACT OF THE DISCLOSURE

Unique chewing gum compositions possessing anticaries activity characteristics comprising a chewing gum base and one or more of the compounds pyruvaldehyde, glycaraldehyde, glycolaldehyde and α-hydroxypropionaldehyde. The chewing gum compositions can and preferably do contain abhesive and flavoring agents.

---

Figure 3:
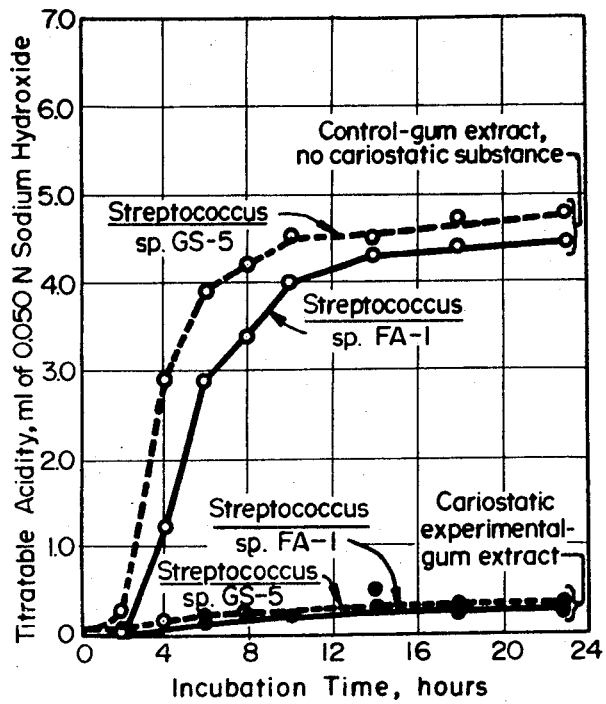

This application is a continuation of our patent application Ser. No. 790,314, filed Jan. 10, 1969.

The present invention contemplates novel and unique chewing gum compositions possessing anticaries activity which, upon chewing, have the ability to inhibit the growth of oral microorganisms and the formation of acids in the oral cavity thereby providing protection for extended periods even after the gum composition has been chewed or masticated and discarded.

Heretofore, it has been generally known and accepted that the elaboration of acid through the breakdown of readily fermentable carbohydrates by the action of acidogenic oral bacteria is a primary cause of dental caries. The method or mechanism of dental caries is generally characterized by a decalcification of the inorganic portion of the tooth and is accompanied by or followed by a disintegration of the organic matrix. The acids are formed on the tooth surface, and, if they are not neutralized or otherwise destroyed, the demineralization of the tooth will proceed.

Dentifrices and similar preparations applied to the tooth surfaces and gums have been one means heretofore customarily employed in the cleaning of teeth; and, in addition, certain proposals have been advanced relative to development of medicated dentifrices having the ability to inhibit tooth decay and for the control of dental caries. Many of such medicated dentifrices contain various inhibiting agents, such as, fluorides or amides.

Another means of control of dental caries involves the use of sodium fluoride by its addition to drinking water to provide a systemic effect, or by its topical application to tooth surfaces and has been accorded some degree of acceptance in this regard in the field. Still another means of control of dental caries involves the use of antibiotics such as penicillin and has produced some desirable results in control of dental caries; but this means is not without certain disadvantages involving sensitization of the patient, thereby limiting its value as a means of control of dental caries.

While numerous means have been heretofore proposed as potential candidates for inhibiting or neutralizing acid formation in the oral cavity as illustrated above, it appears that the problem of control of dental caries is much more complex and is not readily amenable to control by the application of conventional dentifrice preparation by the consumer once or twice a day. It appears that it is necessary for proper control of dental caries that any substance capable of inhibiting the growth of bacteria in the oral cavity should have a sufficiently prolonged effect such that after introduction into the oral cavity sufficient protection would be provided to inhibit the degradation process between periods of application, if not longer. Conventional dentifrices fail to provide such protection, and there is also the disadvantage with dentifrices that the materials are soon washed from the oral cavity, which lessens the time the active ingredients are in contact with the microorganisms.

It is apparent, therefore, that suitable means and compositions are lacking for combating the growth of oral microorganisms and acids during the periods between application of the same to the oral cavity.

It is, accordingly, one object of the present invention to provide an anticaries composition in the form of a chewing gum which eliminates many of the disadvantages normally associated with the use of conventional dentifrices customarily employed for the purpose of control of dental caries.

Another object of the invention resides in the provision of chewing gum compositions having anticaries activity which are not only effective for inhibiting the formation or growth of oral microorganisms in the oral cavity, but also effective against the formation of the acids over extended periods of time. Thus the chewing gum comopsitions would provide protection not only while they are being masticated or chewed, but even after they have been discarded.

Yet another object of the invention resides in the provision of chewing gum compositions containing an aldehyde of the group pyruvaldehyde, glyceraldehyde, glycolaldehyde, and α-hydroxypropionaldehyde, and mixture thereof, which aldehydes and mixtures thereof are readily releasable upon mastication in the oral cavity and are capable of inhibiting 90 percent or more of the growth of the microorganisms and the formation of acids in the oral cavity for prolonged periods of time.

These and other objects and advantages of the present invention will become further apparent from the teachings hereinafter provided by the detailed description, specific examples and drawings.

In accordance with the above objects, it has been discovered that aldehydes of the class described exhibit excellent inhibition of lactic acid formation (90 percent or greater) and growth of oral streptococci and bacilli. As a result of extensive studies and experimental tests, both in vitro and simulated in vivo, of certain compounds (specifically pyruvaldehyde, glyceraldehyde, glycolaldehyde, and mixtures of these aldehydes), it has been observed that they exhibit excellent inhibition of lactic acid formation and growth of oral streptococci and lactobaccilli found in the oral cavity. Additionally, it has been observed that these compounds are readily incorporated into chewing gum bases during chewing gum manufacturing processes and are released therefrom at rates sufficient to provide the level of activity desired for control of dental caries.

Figure 4:
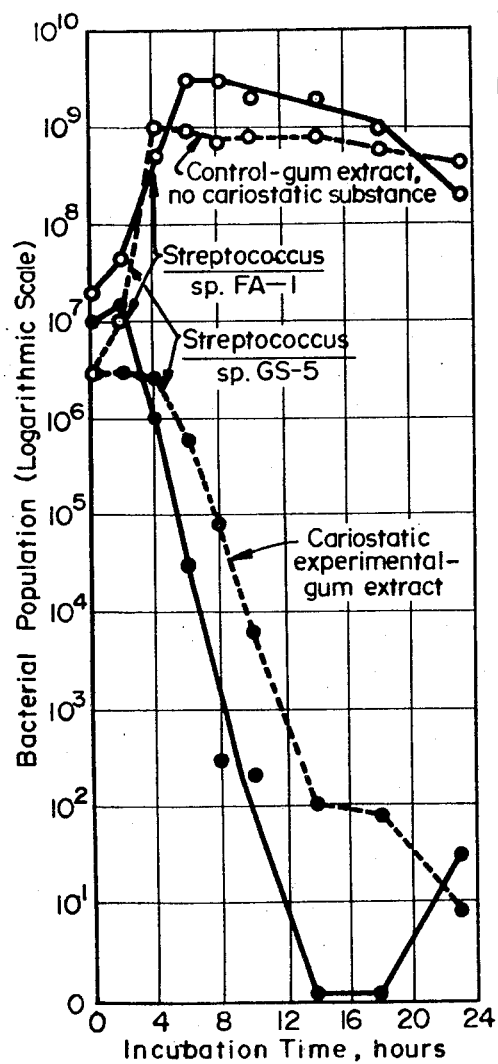

FIGS. 1 through 6 are graphs showing the effect of chewing gum formulations formulated with various percentages of pyruvaldehyde alone or in combination with glyceraldehyde on the growth of oral microorganisms and/or acid production over various incubation time periods.

In accordance with the present invention, it has been found that by incorporating pyruvaldehyde, in concentrations of 0.1 to 2 percent concentration, by weight, of a chewing gum composition, glyceraldehyde, in concentrations of 0.5 to 5 percent by weight of a chewing gum composition and glycolaldehyde in concentrations of 0.5 to 2 percent of a chewing gum composition, and α-hydroxypropionaldehyde in concentrations of 0.1 to 2 percent, by weight of a chewing gum composition will effectively inhibit the formation of lactic acid and the growth of oral microorganisms found in the oral cavity. It has further been found that combinations of pyruvaldehyde and glyceraldehyde, pyruvaldehyde and glycolaldehyde, and glyceraldehyde and glycolaldehyde are also effective within concentrations defined above to reduce to substantially the same degree the formation of acid and the growth of microorganisms. With respect to combinations of pyruvaldehyde and glycolaldehyde, and combinations of glyceraldehyde and glycolaldehyde, the effect is additive relative to the amount of concentration; whereas, evidence indicates that a combination of pyruvaldehyde and glyceraldehyde produces a synergistic effect, which is at least 10 percent more than the additive effect of the aldehydes when used alone in the same concentrations.

The glycolaldehyde and glyceraldehyde are readily available compounds in forms relative to purity which are applicable to incorporation in foods.

Pyruvaldehyde is obtained as an aqueous distillate or as an aqueous phase from a condensed azeotrope. It is nearly colorless, contains approximately 20 to 60 percent substantially pure pyruvaldehyde and contains less than 0.04 percent formaldehyde. Further purification can be performed to provide a formaldehyde content of less than 0.02 percent by weight.

In order to evaluate aldehydic compounds mentioned above for their effectiveness in control of dental caries, many studies and tests of both in vitro and simulated and actual in vivo type were carried out to confirm anticaries activity. The results of these tests are summarized by the tabular data illustrated by Tables I through XII which follow, and which are discussed hereinafter in detail, alone or in conjunction with the graphs illustrated in FIGS. 1 through 6 as they are applicable.

Whenever and wherever the terms "Spearmint flavor gum base," "Juicy Fruit flavor gum base," and "Doublemint flavor gum base," and "P.K. coated gum" are used throughout this specification, they refer to products which are sold under the registered trademarks Wrigley's Spearmint chewing gum, Wrigley's Juicy Fruit chewing gum, Wrigley's Doublemint chewing gum, and Wrigley's P.K. pellet chewing gum which are the proprietary marks of the Wm. Wrigley, Jr. Company of Chicago, Ill.

In the following Tables I through VI, the heading term "Formulation" includes, in addition to the various ingredients already specified thereunder such as "gum base" and/or "abhesive agent" and/or "Spearmint flavor" and the like, other usual chewing gum ingredients such as corn syrup, sugar, corn sugar and the like which are normally employed in chewing gum manufacturing processes to produce chewing gum formulations.

TABLE I.—EFFECT OF SALIVARY EXTRACTS OF PYRUVALDEHYDE EXPERIMENTAL GUM ON MIXED ORAL MICROORGANISMS [a]

| Experimental chewing gum | | | Chewing time, minutes | Degree of inhibition [c] | |
|---|---|---|---|---|---|
| Pyruvaldehyde,[b] percent | Base formulation | Extraction method | | Acid production | Growth |
| 1.0 | Gum base, abhesive spearmint flavor | Brabender [d] | 60.0 | +++ | ++ |
| | | Direct chewing [e] | 2.5 | +++ | +++ |
| 1.0 | Gum base, abhesive, doublemint flavor | Brabender | 60.0 | +++ | ++ |
| | | Direct chewing | 2.5 | +++ | +++ |
| 1.0 | Gum base, abhesive, juicy fruit flavor | Brabender | 60.0 | +++ | ++ |
| | | Direct chewing | 2.5 | +++ | ++ |
| 1.0 | Gum base, abhesive, 1 percent spearmint flavor | Brabender | 60.0 | +++ | +++ |
| | | Direct chewing | 2.5 | ++++ | ++++ |
| | | Direct chewing | 5.0 | +++ | + |

[a] Results reported are for a mixed oral inoculum in human saliva after a 24-hour incubation at 37° C. in the presence of chewing-gum extract.
[b] Purified by the diethylacetal route from commercially produced pyruvaldehyde.
[c] Symbols designate the following degree of inhibition:

| For acid-production inhibition, percent | | For growth inhibition, percent | |
|---|---|---|---|
| − | 0 to 9 | − | 0 to 75 |
| +− | 10 to 24 | +− | 75 to 89 |
| + | 25 to 74 | + | 90 to 98 |
| ++ | 75 to 89 | ++ | 99 to 99.89 |
| +++ | 90 to 98 | +++ | 99.9 to 99.989 |
| ++++ | 99 to 100 | ++++ | >99.99 |

[d] Assay flasks contained 50 percent saliva, a portion of which was derived from the Brabender salivary extract of the experimental chewing gum. Final carbohydrate (glucose/sucrose) concentration of the assay flask contents was 8 percent; theoretical agent content was 0.1 percent.
[e] Assay flasks for direct chewing tests contained 1 part of chewing gum-saliva expectorant to 1 part of carbohydrate-free basal medium. Average final carbohydrate concentration of the assay flasks was 7.7 percent for the 2.5-minute chewing time and 6.9 percent for the 5-minute chewing time.

TABLE II.—EFFECT OF PYRUVALDEHYDE IN EXPERIMENTAL GUM EXTRACTS, OBTAINED BY DIRECT CHEWING, ON MIXED ORAL MICROORGANISMS [a]

| Experimental chewing gum | | Chewing time, minutes | Inhibition [c] | | | |
|---|---|---|---|---|---|---|
| | | | Acid production | | Growth | |
| | | | Maximum effect | 24-hour effect, degree | Maximum effect | 24-hour effect, degree |
| Pyruvaldehyde,[b] percent | Base, formulation | | Incubation time, hours / Degree | | Incubation time, hours / Degree | |
| 0.5 | Spearmint gum base | 2.5 | 10 +++ | −, +− | 6 ++ | −, − |
| | | 5.0 | 11 ++ | − | 6 ++ | − |
| 1.0 | do | 2.5 | 16 ++++ | +++ | 16 ++++ | +− |
| | | 5.0 | 10 ++ | + | 10 ++++ | − |
| 1.5 | do | 2.5 | 24 +++ | +++ | 12 ++++ | ++ |
| | | 5.0 | 10 ++ | − | 6 ++++ | − |
| 2.0 | do | 2.5 | 24 +++ | +++ | 24 ++++ | ++++ |
| | | 5.0 | 6 +++ | + | 6 +++ | − |
| 1.0 | Spearmint flavor gum base, abhesive | 2.5 | 8 +++ | + | 6 ++ | − |
| | | 5.0 | 8 +++ | + | 3 ++ | − |
| 1.0 | Spearmint gum base, abhesive no flavor | 2.5 | 8 +++ | + | 3 ++ | − |
| | | 5.0 | 6 +++ | − | 3 + | − |
| 1.0 | Doublemint, flavor gum base, abhesive | 2.5 | 10 ++++ | + | 10 ++ | − |
| | | 5.0 | 6 +++ | − | 3 ++ | − |
| 1.0 | Juicy fruit, flavor gum base, abhesive | 2.5 | 8 +++ | + | 3 ++ | − |
| | | 5.0 | 8 +++ | + | 6 ++ | − |

[a] Results reported are for a mixed oral inoculum in human saliva. Assay flasks contained 1 part of chewing gum-saliva expectorant and 1 part of sterile human saliva to 2 parts basal medium. Final carbohydrate (glucose-sucrose) concentration of the assay flask was about 3.9 percent for the 2.5-minute chewing time and 3.7 percent for the 5-minute chewing time. Incubation was at 37° C.
[b] Synthesized from dihydroxyacetone.
[c] See Table I for key to symbols.

TABLE III.—EFFECT OF GLYCERALDEHYDE IN EXPERIMENTAL-GUM SALIVARY EXTRACTS, OBTAINED BY DIRECT CHEWING, ON MIXED ORAL MICROORGANISMS [a]

| Experimental chewing gum | | Chewing time, minutes | Inhibition [b] | | | | | |
|---|---|---|---|---|---|---|---|---|
| | | | Acid production | | | Growth | | |
| | | | Maximum effect | | 24-hour effect degree | Maximum effect | | 24-hour effect, degree |
| Glyceraldehyde, percent | Base formulation | | Incubation time, hours | Degree | | Incubation time, hours | Degree | |
| 1.5 | Spearmint, gum base | 2.5 | 6 | + | + | 3 | +− | − |
| | | 5.0 | 6 | + | +− | None | − | − |
| 2.0 | do | 2.5 | 6 | +++ | + | 6 | ++ | +− |
| | | 5.0 | 11 | +++ | + | 9 | ++++ | + |
| 3.0 | do | 2.5 | 10 | +++ | ++ | 9 | ++++ | + |
| | | 5.0 | 10 | +++ | + | 6 | ++ | +− |
| 5.0 | do | 2.5 | 24 | +++ | +++ | 24 | ++++ | ++++ |
| | | 5.0 | 24 | +++ | +++ | 24 | ++++ | ++++ |

[a] Results reported are for a mixed oral inoculum in human saliva. Assay flasks contained 1 part of chewing gum-saliva expectorant and 1 part of sterile human saliva to 2 parts basal medium. Final carbohydrate (glucose-sucrose) concentration of the assay flask was about 3.9 percent for the 2.5-minute chewing time and 3.7 percent for the 5-minute chewing time. Incubation was at 37° C.
[b] See Table I for key to symbols.

TABLE IV.—EFFECT OF GLYCOLALDEHYDE IN EXPERIMENTAL-GUM SALIVARY EXTRACTS ON MIXED ORAL MICROORGANISMS [a]

| Experimental chewing gum | | | Chewing time, minutes | Degree of inhibition | |
|---|---|---|---|---|---|
| Glycolaldehyde,[b] percent | Base, formulation | Extraction method | | Acid production | Growth |
| 1.0, impure | Spearmint. gum base | Brabender | 60.0 | ++ | +++ |
| | | Direct chewing | 5.0 | − | − |
| 1.0, purified | do | Brabender | 60.0 | ++ | ++++ |
| | | Direct chewing | 2.5 | + | − |
| | | Direct chewing | 5.0 | − | − |
| 2.0, purified | do | Brabender | 60.0 | ++ | ++++ |
| | | Direct chewing | 2.5 | +++ | ++++ |
| | | Direct chewing | 5.0 | +++ | ++++ |

[a] Results reported are for a mixed oral inoculum in human saliva after a 24-hour incubation at 37° C.
[b] See Table I for key to symbols.

TABLE V.—EFFECT OF PYRUVALDEHYDE IN COMBINATION WITH GLYCERALDEHYDE IN EXPERIMENTAL GUM EXTRACTS, OBTAINED BY DIRECT CHEWING, ON MIXED ORAL MICROORGANISMS [a]

| Experimental chewing gum | | | Chewing time, minutes | Inhibition [b] | | | | | |
|---|---|---|---|---|---|---|---|---|---|
| | | | | Acid production | | | Growth | | |
| | | | | Maximum effect | | 24-hour effect, degree | Maximum effect | | 24-hour effect, degree |
| Pyruvaldehyde, percent | Glyceraldehyde, percent | Base formulation | | Incubation time, hours | Degree | | Incubation time, hours | Degree | |
| 0.5 [c] | 0.5 | Spearmint gum base | 2.5 | 6 | +++ | − | 3 | ++ | − |
| | | | 5.0 | 6 | +++ | +− | 3 | + | − |
| 0.5 [c] | 1.0 | do | 2.5 | 10 | +++ | + | 10 | ++ | + |
| | | | 5.0 | 11 | +++ | + | 6 | ++++ | − |
| 0.5 [c] | 1.5 | do | 2.5 | 10 | +++ | + | 10 | ++ | +− |
| | | | 5.0 | 6 | +++ | ++ | 10 | +++ | − |
| 0.5 [c] | 2.0 | do | 2.5 | 10 | +++ | + | 3 | ++ | + |
| | | | 5.0 | 10 | +++ | + | 12 | ++ | − |
| 0.5 [d] | 2.0 | Spearmint gum base, abhesive | 2.5 | 24 | +++ | +++ | 10 | ++++ | ++ |
| | | | 5.0 | 9 | +++ | + | 6 | ++ | − |
| 0.5 [d] | 2.0 | Spearmint flavor gum base, abhesive | 2.5 | 24 | +++ | +++ | 10 | ++ | + |
| | | | 5.0 | 9 | +++ | ++ | 6 | +++ | − |
| 0.5 [d] | 2.0 | Doublemint gum base, abhesive, no flavor | 2.5 | 8 | +++ | ++ | 10 | ++++ | +++ |
| | | | 5.0 | 6 | +++ | + | 5 | +++ | + |
| 0.5 [d] | 2.0 | Juicy Fruit flavor gum base, abhesive | 2.5 | 24 | +++ | +++ | 10 | +++ | + |
| | | | 5.0 | 9 | +++ | + | 3 | ++ | + |

[a] Results reported are for a mixed oral inoculum in human saliva. Assay flasks contained 1 part of chewing gum-saliva expectorant and 1 part of sterile human saliva to 2 parts basal medium. Final carbohydrate (glucose-sucrose) concentration of assay flasks was about 3.9 percent for the 2.5-minute chewing time and 3.7 percent for the 5-minute chewing time. Incubation was carried out at 37° C.
[b] See Table I for key to symbols.
[c] Purified by the diethylacetal route from commercially produced pyruvaldehyde.
[d] Synthesized from dihydroxyacetone.

TABLE VI.—EFFECT OF RELEASE RATE OF POTENTIAL CARIOSTATIC AGENTS FROM EXPERIMENTAL CHEWING GUM, OBTAINED BY DIRECT CHEWING, ON INHIBITION OF ORAL MICROORGANISMS [a]

| Experimental chewing gum | | | 5-minute-chewing-time interval,[b] minutes | Inhibition [c] | | | | | |
|---|---|---|---|---|---|---|---|---|---|
| | | | | Acid production | | | Growth | | |
| | | | | Maximum effect | | 24-hour effect, degree | Maximum effect | | 24-hour effect, degree |
| Agents | Concentration, percent | Formulation | | Incubation time, hours | Degree | | Incubation time, hours | Degree | |
| Pyruvaldehyde | 1.0 | Spearmint, abhesive, commercial | First 2½ | 11 | ++++ | +++ | 11 | +++ | +++ |
| | | | Second 2½ | 7 | +++ | − | 7 | ++ | − |
| Pyruvaldehyde | 1.0 | Doublemint, abhesive, commercial | First 2½ | 11 | ++++ | +++ | 11 | ++++ | +++ |
| | | | Second 2½ | 7 | +++ | − | 7 | ++ | − |
| Pyruvaldehyde | 0.5 | Spearmint, abhesive commercial | First 2½ | 12 | +++ | +++ | 22 | ++++ | ++++ |
| d,l-Glyceraldehyde | 2.0 | | Second 2½ | 6 | +++ | +− | 6 | ++++ | − |

[a] Results reported are for salivary extracts of the gums assayed against a mixed oral inoculum. Assay flasks contained 1 part of chewing gum-saliva expectorant to 1 part of basal medium. Final carbohydrate (glucose-sucrose) concentration of the assay flask was 7.9 percent for the first 2½-minute chewing interval and 2.2 percent for the second 2½-minute chewing interval.
[b] The same stick of gum was chewed for 5 minutes. However, saliva and gum extract formed during the first 2½ minutes of chewing was collected and assayed separately from the saliva and gum extract formed during the second 2½ minutes of chewing.
[c] See Table I for key to symbols.

TABLE VII.—INHIBITORY EFFECTS OF ALDEHYDE COMBINATIONS ON ACID PRODUCTION BY SPECIFIC ORAL MICROORGANISMS [a]

| Concentration, percent | | Organism | Acid production inhibition, percent |
|---|---|---|---|
| Pyruvaldehyde | d,l-Glyceraldehyde | | |
| | 0.01 | Streptococcus sp. FA-1 | 4 |
| | 0.015 | Same as above | 10 |
| | 0.02 | ....do.... | 21 |
| 0.001 | | ....do.... | 10 |
| 0.001 | 0.01 | ....do.... | 16 |
| 0.001 | 0.015 | ....do.... | 44 |
| 0.001 | 0.02 | ....do.... | 60 |
| 0.002 | | ....do.... | 35 |
| 0.002 | 0.01 | ....do.... | 70 |
| 0.002 | 0.015 | ....do.... | 89 |
| 0.002 | 0.02 | ....do.... | 91 |
| | 0.02 | Lactobacillus casei | 11 |
| | 0.03 | Same as above | 17 |
| | 0.04 | ....do.... | 22 |
| 0.005 | | ....do.... | 24 |
| 0.005 | 0.02 | ....do.... | 43 |
| 0.005 | 0.03 | ....do.... | 58 |
| 0.005 | 0.04 | ....do.... | 72 |
| 0.0075 | | ....do.... | 57 |
| 0.0075 | 0.02 | ....do.... | 83 |
| 0.0075 | 0.03 | ....do.... | 89 |
| 0.0075 | 0.04 | ....do.... | 93 |

[a] Measured by broth-tube technique.

TABLE VIII.—INHIBITORY EFFECTS OF ALDEHYDE COMBINATIONS ON ACID PRODUCTION BY MIXED ORAL MICROORGANISMS [a]

| Concentration, percent | | Organism | Acid production inhibition, percent |
|---|---|---|---|
| Pyruvaldehyde | d,l-Glyceraldehyde | | |
| | 0.03 | Mixed oral microorganisms | 7 |
| | 0.04 | ....do.... | 12 |
| | 0.05 | ....do.... | 19 |
| | 0.06 | ....do.... | 30 |
| | 0.07 | ....do.... | 40 |
| 0.005 | | ....do.... | 5 |
| 0.005 | 0.03 | ....do.... | 18 |
| 0.005 | 0.04 | ....do.... | 22 |
| 0.005 | 0.05 | ....do.... | 36 |
| 0.005 | 0.06 | ....do.... | 49 |
| 0.005 | 0.07 | ....do.... | 56 |
| 0.007 | | ....do.... | 5 |
| 0.007 | 0.03 | ....do.... | 26 |
| 0.007 | 0.04 | ....do.... | 30 |
| 0.007 | 0.05 | ....do.... | 44 |
| 0.007 | 0.06 | ....do.... | 60 |
| 0.007 | 0.07 | ....do.... | 65 |
| 0.009 | | ....do.... | 7 |
| 0.009 | 0.03 | ....do.... | 27 |
| 0.009 | 0.04 | ....do.... | 28 |
| 0.009 | 0.05 | ....do.... | 49 |
| 0.009 | 0.06 | ....do.... | 62 |
| 0.009 | 0.07 | ....do.... | 68 |
| 0.011 | | ....do.... | 7 |
| 0.011 | 0.03 | ....do.... | 37 |
| 0.011 | 0.04 | ....do.... | 53 |
| 0.011 | 0.05 | ....do.... | 63 |
| 0.011 | 0.06 | ....do.... | 66 |

[a] Measured by broth-tube technique.

TABLE IX.—INHIBITORY EFFECTS OF ALDEHYDE COMBINATIONS ON ACID PRODUCTION BY SPECIFIC ORAL MICROORGANISMS [a]

| Concentration, percent | | Organism | Acid production inhibition, percent |
|---|---|---|---|
| Pyruvaldehyde | d,l-Glyceraldehyde | | |
| | 0.02 | Streptococcus sp. FA-1 | 19 |
| | 0.03 | Same as above | 39 |
| | 0.04 | ....do.... | 72 |
| 0.001 | | ....do.... | 10 |
| 0.001 | 0.02 | ....do.... | 38 |
| 0.001 | 0.03 | ....do.... | 79 |
| 0.001 | 0.04 | ....do.... | 96 |
| 0.002 | | ....do.... | 35 |
| 0.002 | 0.02 | ....do.... | 90 |
| 0.002 | 0.03 | ....do.... | 96 |
| 0.002 | 0.04 | ....do.... | 98 |
| | 0.02 | Lactobacillus casei | 18 |
| | 0.025 | Same as above | 23 |
| | 0.03 | ....do.... | 27 |
| 0.005 | | ....do.... | 24 |
| 0.005 | 0.02 | ....do.... | 44 |
| 0.005 | 0.025 | ....do.... | 47 |
| 0.005 | 0.03 | ....do.... | 56 |
| 0.0075 | | ....do.... | 57 |
| 0.0075 | 0.02 | ....do.... | 67 |
| 0.0075 | 0.025 | ....do.... | 71 |
| 0.0075 | 0.03 | ....do.... | 77 |

[a] Measured by broth-tube technique.

TABLE X.—INHIBITORY EFFECTS OF ALDEHYDE COMBINATIONS ON ACID PRODUCTION BY SPECIFIC ORAL MICROORGANISMS [a]

| Concentration, percent | | Organism | Acid production inhibition, percent |
|---|---|---|---|
| Pyruvaldehyde | d,l-Glyceraldehyde | | |
| | 0.02 | Streptococcus sp. FA-1 | 19 |
| | 0.03 | Same as above | 39 |
| | 0.04 | ....do.... | 72 |
| 0.01 | | ....do.... | 4 |
| 0.01 | 0.02 | ....do.... | 13 |
| 0.01 | 0.03 | ....do.... | 32 |
| 0.01 | 0.04 | ....do.... | 71 |
| 0.015 | | ....do.... | 10 |
| 0.015 | 0.02 | ....do.... | 14 |
| 0.015 | 0.03 | ....do.... | 37 |
| 0.015 | 0.04 | ....do.... | 89 |
| 0.02 | | ....do.... | 21 |
| 0.02 | 0.02 | ....do.... | 24 |
| 0.02 | 0.03 | ....do.... | 47 |
| 0.02 | 0.04 | ....do.... | 85 |
| | 0.02 | Lactobacillus casei | 18 |
| | 0.025 | Same as above | 23 |
| | 0.03 | ....do.... | 27 |
| 0.02 | | ....do.... | 11 |
| 0.02 | 0.02 | ....do.... | 22 |
| 0.02 | 0.025 | ....do.... | 23 |
| 0.02 | 0.03 | ....do.... | 32 |
| 0.03 | | ....do.... | 17 |
| 0.03 | 0.02 | ....do.... | 25 |
| 0.03 | 0.025 | ....do.... | 29 |
| 0.03 | 0.03 | ....do.... | 35 |
| 0.04 | | ....do.... | 22 |
| 0.04 | 0.02 | ....do.... | 33 |
| 0.04 | 0.025 | ....do.... | 37 |
| 0.04 | 0.03 | ....do.... | 44 |

[a] Measured by broth-tube technique.

TABLE XI.—SUMMARY OF IN VIVO EVALUATIONS OF PYRUVALDEHYDE, GLYCERALDEYHDE AND GLYCOLALDEHYDE BY STANDARD METHODS OF EVALUATION [a]

| Agent | Elapsed test days | Number of animals | Strain and animal | Caries score | | Evaluated caries reduction [b] | Statistical evaluation | |
|---|---|---|---|---|---|---|---|---|
| | | | | Mean incidence | Mean extent | | Caries incidence reduction | Caries extent reduction |
| Pyruvaldehyde | 90 | 8 | Osborne-Mendel strain 1, rat | 8.6 | 21.7 | +++ | Significant | Significant. |
| Control (RCD diet) | | 7 | ....do.... | 23.3 | 64.8 | | | |
| Pyruvaldehyde | 90 | 20 | Osborne-Mendel strain 2, rat | 5.95 | 14.55 | ++ | Significant | Significant. |
| Control (L-2000 diet) | | 20 | ....to.... | 15.08 | 38.80 | | | |
| Glyceraldehyde | 56 | 8 | Albino, hamster | 8.0 | 21.8 | +++ | Significant | Significant. |
| Control (L-2000 diet) | | 8 | | 27.5 | 80.9 | | | |
| Glyceraldehyde, crystalline dimer | 91 | 8 | Osborne-Mendel strain 2, rat | 15.0 | 29.4 | ++ | Significant | Significant. |
| Control (L-2000 diet) | | 8 | | 23.5 | 51.0 | | | |
| Glycolaldehyde | 90 | 20 | Osborne-Mendel strain 1, rat | 5.53 | 13.19 | ++ | Significant | Significant. |
| Control (RCD diet) | | 20 | | 12.85 | 35.45 | | | |
| Glycolaldehyde | 90 | 20 | Osborne-Mendel strain 2, rat | 5.44 | 11.69 | ++ | Significant | Significant. |
| Control (L-2000 diet) | | 20 | | 13.94 | 35.38 | | | |

[a] Agents were incorporated in the diet at a 1 percent level.
[b] Symbols designate the following approximate degree of caries reduction: ++ 50 percent, +++ 75 percent.
[c] Evaluated by students T test at the 95 percent confidence limit.

TABLE XII.—CARIOSTATIC COMPOUNDS AND RELATED STRUCTURES; COMPARISON OF ACTIVITY AGAINST ORAL MICROORGANISMS IN VITRO

| Compound | | | Activity [1] acid production inhibition, percent |
|---|---|---|---|
| Formula | | | |
| Empirical | Structural | Name | |
| $(C_2H_4O_2)_2$ | $(HOCH_2CHO)_2$ | Glycolaldehyde, dimer | ++++ |
| $C_3H_4O_2$ | $CH_3COCHO$ | Pyruvic aldehyde | ++++ |
| $C_3H_6O$ | $CH_3CH_2CHO$ | Propionaldehyde | + |
| $C_3H_6O_2$ | $CH_2CHOHCHO$ | α-Hydroxypropionaldehyde | +++ |
| $C_3H_6O_2$ | $HOCH_2CH_2CHO$ | β-Hydroxypropionaldehyde | +− |
| $C_3H_6O_3$ | $HOCH_2CHOHCHO$ | Glyceraldehyde | + |

[1] See note (c) Table I.

With respect to the simulated in vivo methods, microbiological assays of the extracts were obtained by direct-chewing of gum and also from Brabender salivary extracts of gum. The majority of these gums were prepared from ordinary commercial gums having a conventional gum base and flavoring additive. In other related studies, the influence of an abhesive agent and flavoring components on potential cariostatic activity of the compounds was also investigated. In this case, for comparison, with each experimental chewing gum a control gum of the same base composition without the agent added was formulated and tested.

The gum base referred to above covers the nonnutritive, masticatory substance in chewing gun, as defined in the Federal Food, Drug and Cosmetic Act. In the regulation covering chewing gum ingredients under the Food Additives Amendment (Federal Register, p. 4419, May 9, 1962), paragraph (a) sets forth the ingredients permitted in chewing gum base under the regulation, and paragraph (c) defines the term "chewing gum base" as meaning "the manufactured or partially manufactured non-nutritive masticatory substance comprised of one or more of the ingredients named and so defined in paragraph (a) of this section." Suitable representative chewing gum bases which can be employed with facility in formulating the chewing gum compositions of the invention are those disclosed, for example, in U.S. 2,284,804 of F. T. De Angelis and U.S. 2,137,746 of R. L. Wilson.

In the tests the flavoring agents employed were mostly Spearmint, although some of the tests did disclose the use of Doublemint and Juicy Fruit flavoring.

Where employed, the abhesive agent was a water-soluble hydrolyzable tannin in a water-containing hydrophilic gel. A typical abhesive agent which can be added to a given base contains water, glycerine, gelatin and tannic acid.

Abhesives are used in the hereafter described chewing gum formulations to counteract the tendency of chewing gum compoistions to adhere to teeth and particularly to certain types of dentures and artificial teeth. A hydrophilic gel such as gelatin, in the preferred embodiments, is made into a heavy paste with water, and forms with a water-soluble, hydrolyzable tannin such as tannic acid, a hydrogen-bonded adduct thereby reducing the water solubility of the tannin and decreasing the rate at which it is extracted from the gum. The plasticizer, or glycerine, is a cosolvent which acts with the water to form a gel of higher viscosity than is obtainable with water alone.

The abhesive, in addition to the plasticized gelatin-tannic acid adduct, may also include an amount of free tannic acid. The plasticized gel functions merely to reduce the rate of tannic acid extraction after the gum is hydrated, and accordingly, the free tannic acid may be preferred to provide initial abhesive action.

It should be noted that U.S. Pat. No. 3,255,018 describes a wide variety of abhesives and methods of incorporating the said abhesives into chewing gum compositions. An abhesive comprising a plasticized gelatin-tannic acid adduct together with free tannic acid as described therein is preferred. However, the chewing gum compositions of this invention may include any desired abhesive and the use of the gelatin-tannic acid adduct and tannic acid is not intended to limit the scope of this invention in any way. Accordingly, the abhesives of U.S. Pat. No. 3,255,018 together with the methods of formulating the said abhesives and including them in chewing gum compositions disclosed therein are hereby incorporated in their entirety.

The anti-caries agent or aldehyde is added in the same manner as the abhesive agent or flavoring is added to the gum and may be mixed with these agents prior to their incorporation in the gum.

The simulated in vivo tests and their results are illustrated in the tables appearing above wherein the cariostatic potential of the formulations was studied by microbiological assay techniques and in special cases by chemical analysis. Extracts of the chewing gums were prepared by direct chewing by human subjects. The antimicrobial activity of the extracts obtained by direct chewing was determined by measuring simultaneously the effect of the extracted compound on acid production and growth of the mixture of oral microorganisms which were expectorated from the oral cavity along with saliva, sucrose, and other solubles derived from chewing gum. The effect of duration of contact between the oral microorganisms and the salivary extracts containing the cariostatic agent was determined also. The organisms employed for these studies were the normal inhabitants of the oral cavity, derived from the oral mucosa, tongue, teeth, and some plague-associated organisms which were dislodged from the tooth surfaces during chewing of formulated gum or a flavorless, sugarless, paraffin-plasticized gum.

The Brabender special mixer for chewwing gum studies was employed as a mechanical means of extracting solubles from large quantities (150 to 175 grams charge) of gum by sterile human saliva. Aliquots of the mechanically prepared, aseptic extracts were assayed for their antimicrobial effect against pure cultures of *Lactobacillus casei*, Streptococcus species FA–1, and Streptococcus species GS–5 (a human-caries isolate), as well as a mixed oral microbial population.

The anti-microbial properties of pyruvaldehyde and its acid inhibiting properties, when mixed in chewing gum compositions is illustrated in Table I and Table II. The data obtained from these tests, as set forth in Tables I and II, illustrate that pyruvaldehyde at the 1.0 weight percent level in gum, for example, is effective to the point that acid production is reduced by more than 90 percent over the 24-hour period, and growth of oral microorganisms is reduced by more than 99.0 percent for about 16 to 17 hours of the incubation time period. FIGS. 1 and 2 more dramatically illustrate the effect of pyruvaldehyde at various concentrations on the growth of oral microorganisms and inhibition of acid production during the test periods.

Subsequent assays were carried out employing one part of the chewing gum-saliva expectorant and one part of sterile saliva to two parts of the basal medium. The glucose-sucrose mixture obtained from the gum during chewing was the only carbon and energy source available to the oral microorganisms during all of these studies. The carbohydrate concentration in the assay flasks after ¼ dilution of the gum extract averaged 3.9 percent for a 2½ minute chewing time and 3.7 percent for a 5 minute chewing time. The results of these expanded direct chewing studies with a pyruvaldehyde-containing gum are given in Table II above. The extent of inhibition is reported at that hour of incubation when a maximum effect was observed, as well as the extent at the end of the assay, 24 hours.

To determine the anti-microbial effect of glyceraldehyde alone in chewing gum, tests were made as illustrated in Table III. It can be observed from Table III that 3 percent glyceraldehyde is required to effect an overwhelming inhibitory effect upon mixed oral microorganisms and to reduce acid production to this effect. At the 5 percent level, almost complete inhibition of acid production and oral microorganism growth was achieved.

Investigations with regard to the activity of glycolaldehyde indicate that its anti-microbial properties, even though less than that of pyruvaldehyde, are much greater than that of glyceraldehyde as can be observed in Table IV.

Having thus determined the acid and microbial inhibition of pyruvaldehyde, glyceraldehyde and glycolaldehyde alone, mixtures of pyruvaldehyde and glyceraldehyde were then tested at various concentrations.

The data obtained from the testing of mixtures of 0.5 weight percent pyruvaldehyde with some 0.5 weight percent to 2.0 weight percent glyceraldehyde are set forth in Table V. As indicated in the tests, the best results of assays of salivary extracts relative to anti-microbial activity were obtained with the gum formulation with 0.5 weight percent pyruvaldehyde and 2.0 weight percent glyceraldehyde. The activity of this combination, containing a total of 2.5 weight percent of the combined aldehydes, against oral microorganisms was approximately equivalent to that obtained with gum formulation formulated with 1.5 weight percent pyruvaldehyde, regardless of whether the gum base is used alone or with an abhesive agent or with a flavoring additive.

Since the direct-chewing procedure employed a mixture of oral microorganisms normally present in the mouth, it was not possible to follow the effect of this combination of agents on any one bacterial species. Therefore, a salivary extract of the Spearmint-based gum containing abhesive agent, flavor, and 0.5 weight percent pyruvaldehyde and 2.0 weight percent d,l-glyceraldehyde was prepared by the Brabender special mixer under aseptic conditions. A commercial Spearmint gum with no cariostatic agent was extracted and used as a control. The composition of the assay flasks was arranged so that the amount of gum extractables employed was as nearly identical as possible to the amount obtained by direct chewing for 5 minutes. The conditions used for obtaining the results were the same as the conditions employed in direct-chewing studies reported in Table V. The results are presented graphically in FIGS. 3 to 6. Two species of oral streptococci were employed, including strain GS–5, a microorganism implicated in human caries. The nearly complete suppression of acid production and drastic reduction in cell population of these streptococci is illustrated graphically in FIGS. 3 and 4. A human oral isolate, Lactobacillus casei (ATCC 4646) and a mixed oral inoculum collected and blended from several human subjects were employed for further assay flask studies as shown in FIGS. 5 and 6.

The effect of the release rate of potential cariostatic agents from experimental chewing gum obtained by direct chewing was investigated, the results of which are shown in Table VI. Two gums were employed: one formulated with 1.0 weight percent pyruvaldehyde only, the other with the combination of 0.5 weight percent pyruvaldehyde and 2.0 weight percent glyceraldehyde. The stick of gum was chewed for 5 minutes. The saliva and gum extract formed during the first 2½ minutes of chewing was collected and assayed separately from the saliva and gum extract formed during the second 2½ minutes of chewing. It appears that the majority of the cariostatic agent(s) was liberated from the gum with most of the carbohydrates (78 percent of total extractables) during the first 2½ minutes of chewing. Nevertheless, significant inhibitory activity was observed in the extract obtained during the second 2½ minute chewing period over the first 6 to 7 hours of incubation. Long-term (24 hour) inhibitory effects were not measured.

Further in vitro tests were made relative to combinations of pyruvaldehyde, glyceraldehyde, and glycolaldehyde. Each combination was evaluated for its ability to reduce the amount of acid produced by a pure culture of either Lactobacilius casei or Streptococcus species FA–1. Simultaneously, each substance was evaluated individually. The results of these tests are reported in Tables VII through X. As can be seen from Tables VII through X, the aldehydes can be replaced by one another to give additive effects and, in the case of pyruvaldehyde with glyceraldehyde, a synergistic effect was achieved wherein the inhibition of acid production was greater than the additive effect of the two aldehydes at the concentrations used.

Table XI summarizes in vivo evaluations of pyruvaldehyde, glyceraldehyde, and glycolaldehyde. Standard laboratory techniques were used to compile the data presented. In each case, the aldehyde was incorporated into each specimen's food in a 1 percent, by weight, quantity over a period of several weeks. In all cases, caries reduction of over 50 percent was noted. As tabulated in Table XI, each of the aldehydes tested exhibited significant reduction in both the incidence of dental caries and the extent of dental caries in the laboratory animals.

In addition to pyruvaldehyde, glyceraldehyde, and glycolaldehyde, tests were conducted with α-hydroxypropionaldehyde, β-hydroxypropionaldehyde, and propionaldehyde. Activity, acid-production inhibition, was measured by a broth-tube assay to determine the percent of acid-production inhibition obtained by Lactobacillus casei and Streptococcus species FA–1 in the presence of 0.1 percent of the compound tested.

The results are summarized in Table XII and the results of similar tests for pyruvaldehyde, glyceraldehyde and glycolaldehyde are included for the purposes of comparison. The three last mentioned aldehydes exhibit acid inhibition in the range of 99 to 100 percent as compared to 90 to 98 percent for α-hydroxypropionaldehyde. Propionaldehyde and β-hydroxypropionaldehyde were much less effective.

α-Hydroxypropionaldehyde is noted herein as a significant anticaries agent. It is effective within the range of 0.1 to 2.0 weight percent with about 0.5 weight percent preferred. This aldehyde may be synthesized according to any well-known method yielding a product of suitable purity. β-hydroxypropionaldehyde and propionaldehyde are only moderate acid inhibitors and therefore are somewhat less significant for the purpose of inclusion in a chewing gum composition.

As indicated above, pyruvaldehyde is effective in concentrations of 0.1 to 2.0 percent by weight of the chewing gum composition. A preferred concentration is above 0.5 percent.

With regard to glyceraldehyde, it can be employed with facility in concentrations of from 0.5 to 5.0 percent by weight of the chewing gum composition and when employed as the sole cariostatic agent, a preferred concentration is above about 2.0 percent by weight of the total composition.

Glycolaldehyde is effective and can be employed in amounts of from 0.5 to 2.0 weight percent with a concentration of above about 1.0 weight percent being preferred.

The following examples illustrate the incorporation of the anticaries agents of this invention on each of three basic chewing gum formulations.

In Example 1(A) through (Z) a general formula with alternative ingredients and quantities thereof illustrates the method of making a stick gum with the anticaries agent of this invention. The second example relates to coated gum, and the third relates to bubble gum. It should be noted that the chewing gum formulations are illustrative only, and may be varied as would be obvious to one skilled in the art without departing from the concept of this invention which specifically includes the incorporation of an anticaries agent in any chewing gum composition.

the anti-caries agent is to be added in whole or in part to the center the procedure of Example I is followed.

After the centers are sheeted and cooled they are broken into individual pieces. A weighed quantity of center is added to each coating pan. A sugar syrup and a gum arabic solution are prepared for the coating opera-

EXAMPLE I.—FORMULATION (PARTS BY WEIGHT)

| Ingredient | (A) | (B) | (C) | (D) | (E) | (F) | (G) | (H) | (I) | (J) | (K) | (L) | (M) |
|---|---|---|---|---|---|---|---|---|---|---|---|---|---|
| Gum base | 20.0 | 20.0 | 20.0 | 20.0 | 20.0 | 21.0 | 21.0 | 21.0 | 20.46 | 19.82 | 19.05 | 20.37 | 19.86 |
| Gelatin-tannic acid adduct | 2.6 | 2.6 | 2.6 | 2.6 | 2.6 | | | | 2.36 | 2.28 | 2.20 | 2.35 | 2.28 |
| Corn syrup | 20.1 | 20.0 | 20.0 | 20.0 | 20.0 | 15.7 | 14.2 | 11.2 | 12.98 | 11.74 | 13.24 | 12.92 | 11.77 |
| Sugar | 55.2 | 55.2 | 53.7 | 53.7 | 53.7 | 57.1 | 57.1 | 57.1 | 60.45 | 62.08 | 61.86 | 60.17 | 62.19 |
| Corn sugar | 1.6 | 1.6 | 1.6 | 1.6 | 1.6 | 1.6 | 1.6 | 1.6 | 1.55 | 1.49 | 1.44 | 1.54 | 1.49 |
| Tannic acid | 0.1 | 0.1 | 0.1 | 0.1 | 0.1 | | | | 0.10 | 1.10 | 0.10 | 0.10 | 0.10 |
| Glycerine | 1.6 | 1.6 | 1.6 | 1.6 | 1.6 | 1.6 | 1.6 | 1.6 | 0.15 | 0.23 | | 0.15 | 0.23 |
| Flavor | 0.6 | 0.6 | 0.6 | 0.6 | 0.6 | | | | 0.55 | 0.88 | 0.71 | 1.00 | 0.88 |
| Pyruvaldehyde | 0.9 | 1.0 | 0.5 | | 0.5 | | | | 1.00 | 1.00 | 1.00 | 1.00 | 0.50 |
| Glycolaldehyde | | | | 1.0 | | | | | | | | | |
| Glyceraldehyde | | 2.0 | 1.0 | 0.5 | 2.0 | 3.0 | 5.0 | | | | | | 0.50 |
| α-Hydroxypropionaldehyde | | | | | | | | | | | | | |

| Ingredient | (N) | (O) | (P) | (Q) | (R) | (S) | (T) | (U) | (V) | (W) | (X) | (Y) | (Z) |
|---|---|---|---|---|---|---|---|---|---|---|---|---|---|
| Gum base | 20.8 | 20.6 | 20.9 | 20.6 | 20.4 | 20.5 | 20.4 | 20.2 | 20.7 | 20.5 | 20.57 | 20.46 | 20.0 |
| Gelatin-tannic acid adduct | | | | | | | | | | | 2.37 | 2.36 | 2.6 |
| Corn syrup | 18.5 | 18.3 | 18.6 | 18.3 | 18.2 | 18.3 | 18.1 | 18.0 | 18.4 | 18.3 | 13.05 | 12.98 | 20.0 |
| Sugar | 56.5 | 55.9 | 56.6 | 55.8 | 55.4 | 55.8 | 55.3 | 55.1 | 56.2 | 55.7 | 60.80 | 64.50 | 55.2 |
| Corn sugar | 1.6 | 1.6 | 1.6 | 1.6 | 1.6 | 1.6 | 1.6 | 1.5 | 1.6 | 1.6 | 1.56 | 1.55 | 1.6 |
| Tannic acid | | | | | | | | | | | 0.10 | 0.10 | 0.1 |
| Glycerine | 1.6 | 1.6 | 1.6 | 1.6 | 1.6 | 1.6 | 1.6 | 1.5 | 1.6 | 1.6 | 0.15 | 0.15 | 1.6 |
| Flavor | | | | | | | | | | | | 0.55 | 0.6 |
| Pyruvaldehyde | | | 0.5 | 1.5 | 2.0 | 0.5 | 0.5 | 0.5 | 0.5 | | 1.00 | 1.00 | |
| Glycolaldehyde | 1.0 | 2.0 | | | | | | | | | | | |
| Glyceraldehyde | | | | | | 1.0 | 1.5 | 2.0 | 0.5 | 1.5 | | | |
| α-Hydroxypropionaldehyde | | | | | | | | | | | | | 1.0 |

The gum base is softened by working in a warm mixer maintained at a temperature of 122° F. The gelatin-tannic acid adduct is then added and thoroughly mixed with the softened base. All of the corn syrup is then added along with the anticaries agent followed by two-thirds of the mixture of sugar and corn sugar. When these ingredients are well mixed, the glycerine is added followed by the balance of the sugar-corn sugar mixture. Subsequently the tannic acid is added followed by the flavor which may be, for example, Spearmint, Doublemint, or Juicy Fruit. As soon as the last ingredients are thoroughly mixed, the batch is discharged, allowed to cool slightly, sheeted and scored in the usual fashion.

Columns (A) through (Z) represent the parts by weight of stick chewing gum formulations.

EXAMPLE II

The following example is a generalized formula for a coated gum formulation such as Wrigley's P.K. pellet chewing gum. The anticaries agents are those listed in Example I.

The anticaries agent may be, pyruvaldehyde in concentrations of 0.1 to 2.0 weight percent; glyceraldehyde in concentrations of 0.5 to 5.0 weight percent, or glycolaldehyde in concentrations of 0.5 to 2.0 weight percent, or as described in Example I any combination of these within the limits suggested above. α-Hydroxypropionaldehyde in concentrations of 0.1 to 2.0 weight percent may also be used.

Center: Percent by weight
- Glycerine _____ 0.76
- Sugar _____ 50.43
- Corn Syrup _____ 20.93
- Corn Sugar _____ 1.90
- Flavor _____ 0.76
- Gum base _____ 25.22

Coating:
- Carnauba wax _____ 0.01
- Sugar _____ 92.49
- Gum arabic _____ 5.52
- Dextrin _____ 1.38
- Flavor _____ 0.60

The centers are mixed as described in Example I and may include an abhesive agent as therein described. If the anticaries agent is to be added in whole or in part to the center the procedure of Example I is followed.

After the centers are sheeted and cooled they are broken into individual pieces. A weighed quantity of center is added to each coating pan. A sugar syrup and a gum arabic solution are prepared for the coating operation. The rotation of the coating pan begins and a dipper of the syrup-gum arabic mixture is added to the centers. Warm air is used to dry the mixture on the centers. Flavor is added at appropriate intervals during the coating operation. If the anticaries agent is to be added to the coating it may be added with the flavor. The gum arabic is eliminated from the coating mixture and only syrup is used during the second coat. Forty coats in all are applied. The finished pieces are polished with Carnauba wax.

EXAMPLE III

The following example pertains to the formulation of a bubble gum composition including an anticaries agent. The anticaries agent is selected from the list of Examples I and II and may be incorporated into the chewing gum composition of this example in the same manner as previously described. The ingredients listed comprise a master formula to which pyruvaldehyde in concentrations of 0.1 to 2.0 weight percent, glyceraldehyde in concentrations of 0.5 to 5.0 weight percent and glycolaldehyde in concentrations of 0.5 to 2.0 weight percent may be added. As in Examples I and II the previously mentioned aldehydes may be used alone or in combinations as described within the limits suggested. α-Hydroxypropionaldehyde in concentrations of 0.1 to 2.0 weight percent may also be used.

Ingredients: Percent by weight
- Gum base _____ 16.8
- Corn syrup _____ 22.4
- Sugar _____ 59.7
- Water _____ 0.3
- Glycerine _____ 0.3
- Flavor _____ 0.5

The gum base is softened by working in a warm mixer maintained at a temperature of 122° F. All of the corn syrup is then added along with the anticaries agent followed by two-thirds of the sugar. When these ingredients are well mixed, water and glycerine are added followed by the balance of the sugar. Finally, the flavor is incorporated. As soon as all the ingredients have been thoroughly mixed, the batch is discharged, allowed to cool slightly, and formed into individual pieces of desired shapes and sizes, and scored in the usual fashion.

Having thus described the compositions of the invention in terms of their preferred embodiments as set forth in the description and examples of the aforesaid specification, it is apparent to those skilled in the art that various changes and modifications can be made in these compositions without departing from the spirit and scope of the invention. Thus, for example, it is apparent that although only pyruvaldehyde, glyceraldehyde, and glycolaldehyde and mixtures thereof have been specifically set forth in the instant specification, other ketoaldehyde and alpha-hydroxyaldehydes exhibiting similar or equivalent biological activity can be employed with facility in formulating the compositions of the invention. In a like manner, it is also contemplated as being within the general spirit and scope of the invention that ketoaldehydes and alpha-hydroxyaldehydes and dimers thereof of both the water soluble and water insoluble types can be employed in manufacturing the compositions of the invention.

It should also be noted that the ketoaldehyde and alpha-hydroxyaldehydes enumerated above also find immediate and practical utility as humectants in the manufacture of the compositions of the invention aside from their antimicrobial characteristics. Thus, where desired, they can be incorporated into chewing gum compositions as they contribute a favorable effect on the moisture demands of sugars and resins employed in the manufacture of chewing gums. While the exact mechanism or nature of the humectant effect of pyruvaldehyde, glyceraldehyde and glycolaldehyde and mixtures thereof on chewing gum compositions is not known, it appears that they exert a favorable influence on the chewing gum complex in that the chewing gum composition retains moisture and flexibility. Thus, the compounds enumerated above offer additional advantages in that in addition to cariostatic effect, a humectant effect can be imparted to the chewing gum compositions of the invention.

What is claimed and desired to be secured by United States Letters Patent is:

1. Chewing gum containing an effective amount of pyruvaldehyde to provide the gum anticaries activity.
2. The chewing gum of claim 1 wherein the pyruvaldehyde is present in an amount of from 0.1 to 2.0 percent by weight of the chewing gum composition.
3. The chewing gum of claim 2 wherein the pyruvaldehyde is present in an amount of at least 0.5 percent by weight of the chewing gum composition.
4. Chewing gum containing an effective amount of glycolaldehyde to give the gum anticaries activity.
5. The chewing gum of claim 4 wherein the glycolaldehyde is present in an amount of from 0.5 to 2.0 percent by weight of the chewing gum composition.
6. The chewing gum of claim 5 wherein the glycolaldehyde is present in an amount of at least 1.0 percent by weight of the chewing gum composition.
7. Chewing gum containing an effective amount of glyceraldehyde to give the gum anticaries activity.
8. The chewing gum of claim 7 wherein the gyceraldehyde is present in an amount of from 0.5 to 5.0 percent by weight of the chewing gum composition.
9. The chewing gum of claim 8 wherein the glyceraldehyde is present in an amount of at least 2.0 percent by weight of the chewing gum composition.
10. Chewing gum containing an effective amount of pyruvaldehyde and glyceraldehyde to give the gun anticaries activity.
11. The chewing gum of claim 10 wherein the pyruvaldehyde is present in an amount of from 0.1 to 2.0 percent and glyceraldehyde is present in an amount of from 0.5 to 5.0 percent, all percent being by weight of the chewing gum composition.
12. The chewing gum of claim 11 wherein the pyruvaldehyde is 0.5 percent and the glyceraldehyde is 2.0 percent, all percents being by weight of the chewing gum composition.
13. Chewing gum containing an effective amount of pyruvaldehyde and glycolaldehyde to give the gum anticaries activity.
14. The chewing gum of claim 13 wherein the pyruvaldehyde is present in an amount of from 0.1 to 2.0 percent and glycolaldehyde is present in an amount of from 0.5 to 2.0 percent all percents being by weight of the chewing gum composition.
15. The chewing gum of claim 14 containing at least 0.1 weight percent of pyruvaldehyde.
16. Chewing gum containing an effective amount of glycolaldehyde and glyceraldehyde to give the gum anticaries activity.
17. The chewing gum of claim 16 wherein the glycolaldehyde is present in an amount of from 0.5 to 2.0 percent and glyceraldehyde is present in an amount of from 0.5 to 5.0 percent, all percents being by weight of the chewing gum composition.
18. Chewing gum containing an effective amount of $\alpha$-hydroxypropionaldehyde to give the gum anticaries activity.
19. The chewing gum of claim 18 wherein the $\alpha$-hydroxypropionaldehyde is present in about 0.5 weight percent of the chewing gum composition.

References Cited

UNITED STATES PATENTS

| | | | |
|---|---|---|---|
| 2,801,216 | 7/1957 | Yoder et al. | 424—333 |
| 3,497,590 | 2/1970 | Eigen | 424—49 |
| 2,886,443 | 5/1959 | Rosenthal et al. | 99—135 |
| 2,886,445 | 5/1959 | Rosenthal et al. | 99—135 |

FOREIGN PATENTS 1,228,510  8/1960  France.

OTHER REFERENCES

Chemical Abstracts, vol. 52, entry 3952f, 1958.
Chemical Abstracts, vol. 62, entry 7232h–7233a, 1965.
Derwent Farmdoc No. 12,992, Abstracting Japanese Patent No. 10,232/64 published June 1964.

RICHARD L. HUFF, Primary Examiner

U.S. Cl. X.R.

424—333

UNITED STATES PATENT OFFICE
CERTIFICATE OF CORRECTION

Patent No. 3,651,206      Dated March 21, 1972

Inventor(s) J. H. LITCHFIELD AND V. G. VELY

It is certified that error appears in the above-identified patent and that said Letters Patent are hereby corrected as shown below:

In Column 1, lines 15 - 16, "glycaraldehyde" should read -- glyceraldehyde --.
In Column 2, line 21, "comopsitions" should read -- compositions --; line 28, "mixture" should read -- mixtures --; line 48, "lactobaccilli" should read -- lactobacilli --.
In Column 5, line 14 of Table V, "Spearmint flavor gum base, abhesive" should read -- Doublemint flavor gum base, abhesive --.
In Column 8, lines 27, 28 and 29, Table X, "Concentration, percent

| Pyruval-dehyde | d,1-Glycer-aldehyde" | should read

-- Concentration, percent

| d,1-Glycer-aldehyde | Glycol-aldehyde | --. |

In Columns 7 and 8, line 10 of Table XI, in the column entitled "Strain and animal", "to" should read -- do --.
In Column 9, line 14 of Table XII, in the column entitled "Activity[1] acid production inhibition, percent", "+" should read -- ++++ --; line 28, "gun" should read -- gum --; line 54, "compoistions" should read -- compositions --.
In Column 10, line 47, "chewwing" should read -- chewing --.
In Columns 13 and 14, line 8 of Example I, in the column entitled "(J)", "1.10" should read -- 0.10 --.
In Column 16, line 2, Claim 10, "gun" should read -- gum --; line 7, Claim 11, "percent" second occurrence should read -- percents --.

Signed and Sealed this

Second Day of November 1976

[SEAL]

Attest:

RUTH C. MASON
Attesting Officer

C. MARSHALL DANN
Commissioner of Patents and Trademarks